June 18, 1929.  W. A. BURNS  1,717,434
SIGN
Filed Sept. 12, 1927

INVENTOR
W. A. BURNS,
BY
ATTORNEY

Patented June 18, 1929.

1,717,434

UNITED STATES PATENT OFFICE.

WILLIAM ALBERT BURNS, OF BRONDESBURY, LONDON, ENGLAND.

SIGN.

Application filed September 12, 1927, Serial No. 219,026, and in Great Britain March 31, 1927.

This invention refers to box signs and has for its object to provide a sign adapted to be used either by day or by night, that is to say, either by means of its self-contained source of illumination or by means of illumination derived from the sky or when used in a shop window front from the normal lighting means of a shop front.

It is an object of the invention to provide a box sign having a forwardly-arranged display device such as a transparent stencil and a rearwardly-arranged reflector, means for illumination being provided behind the said reflector. The space between the reflector and the stencil is left uncovered or may be covered by clear glass, and light entering this space is reflected by the reflector through the stencil which it renders visible. When no external light is available with access into this said space illumination is provided from the means arranged behind the reflector which may comprise ordinary electric light bulbs, and the stencil is again rendered visible.

Accordingly, the reflector comprises a plate of glass having one surface silvered, the silvering being however removed over a multitude of small areas within the total area of the reflector so as to leave these areas clear. Preferably, the said areas are similarly shaped and are equally spaced in two dimensions at right angles to each other.

Such a mirror is preferably formed by the use of a stencil comprising an opaque sheet, for example, metal, having a multitude of small areas cut away from its total area. The glass is wholly silvered on its rearward surface and the stencil so formed laid behind the silvering. The silvering is then removed by sand blasting through the open areas of the stencil. The effect of this is to render the glass translucent over the said small areas whilst leaving the remaining area of the silvering untouched. The small areas are, however, not transparent in the strict sense permitting a clear view to be had of a source of illumination arranged behind the reflector, since the sand blasting roughens the surface of the glass when the silvering is removed leaving it dull and breaking up light rays passing through the glass so that objects regarded therethrough are not clearly perceived. The areas, however, remain translucent in that they readily transmit light therethrough but the rays of light are scattered on reaching the surface owing to its roughened quality.

The invention is not however limited to a silvered mirror, as a sheet of polished metal could be employed in which the metal was cut clean away over the multitude of small areas.

The invention is illustrated in the accompanying drawing in which

Figure 1:
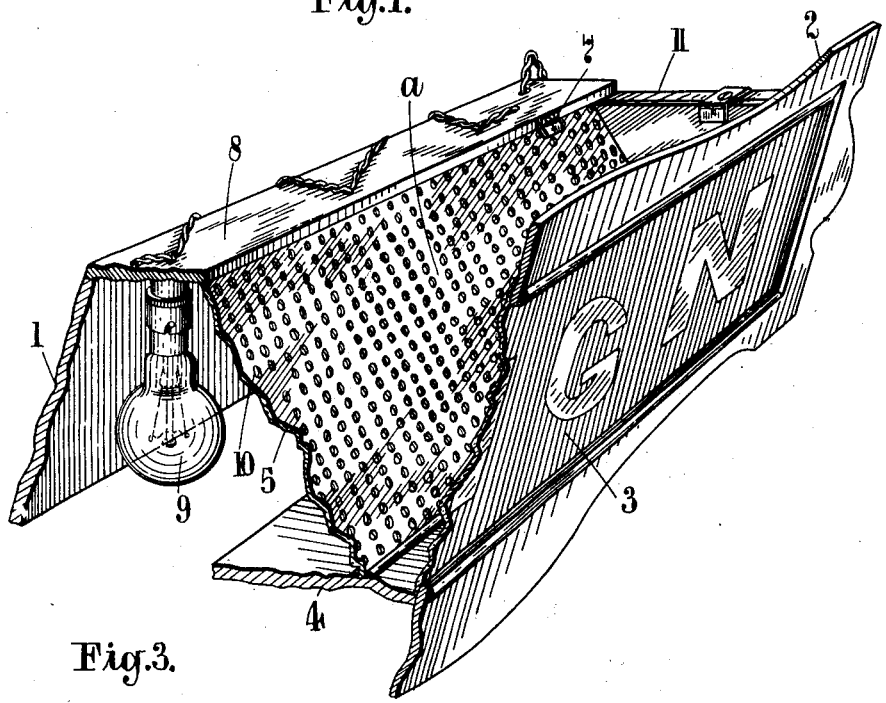
Fig. 1 shows a perspective view partly broken away of the box sign according to the invention, Fig. 2 being an end view of Fig. 1.

Turning now to the drawings, the form here illustrated comprises a frame 1 having a front framing 2 against which is placed a display device 3 here shown in the form of a stencil which is generally opaque and has clear letters. The display device 3 leans against the back of the framing 2 which is inclined forwardly from the base plate 4 of the sign frame 1. The translucent reflector 5 is arranged behind the stencil 3 at an angle thereto. In the form shown it is inclined rearwardly from the base plate 4 and the bottom edges of the stencil 3 and reflector 5 are spaced some slight distance from each other. The reflector 5 leans against blocks 6 formed on the side walls of the sign frame 1 and the stencil and reflector are held down by copper clips 7 of usual form. Rearwardly of the reflector 5 the box sign frame comprises an upper horizontal batten 8 from which one or more electric lamp bulbs 9 are suspended to serve as a source of illumination behind the reflector 5.

Figure 3:
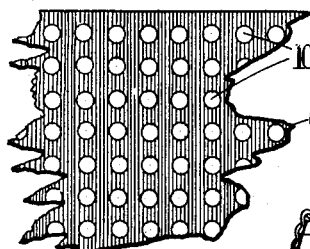
Fig. 3 is a detail view of a fragment of a reflector shown to an enlarged scale.
Figure 2:
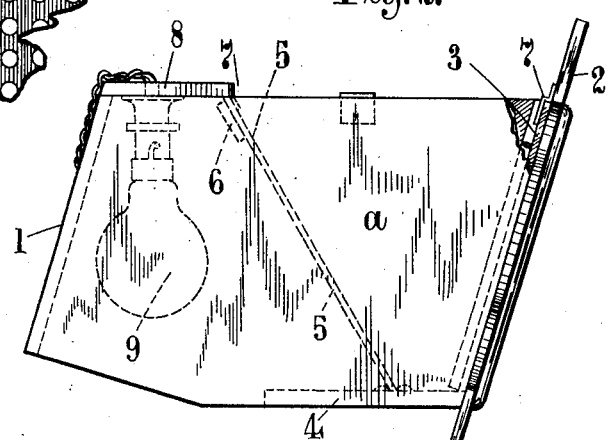

The reflector 5 in the form shown comprises a glass plate which has been silvered over all its rearward surface, the silvering however having been removed over a multitude of small, circular, equally-spaced areas 10. These extend in a regular manner over the whole area of the glass plate 5. For the sake of clearness they are not shown as so extending in Fig. 1, but Fig. 3 showing a detail view of the glass clearly illustrates how this reflector is formed. According to this figure the clear areas are one quarter of an inch in diameter and are positioned at the angles of squares of one half inch side similarly and regularly over all the surface of the glass. This spacing leaves about 78 per cent of the original silvering untouched, that is to say the total area of the small areas is about 22 per cent of the total area of the reflector. I find, however, that it is possible to increase the total area removed up to about 40 per cent of the total area of the reflector without impairing the efficiency of the sign when employing daylight illumination, it being of course clear that the removal of silvering adds to the efficiency of the sign when employing illumination from the lamp 9. Generally speaking, however, it appears inadvisable to remove more than 40 per cent of the total amount of the silvering in the manner described. As stated, the silvering is removed by sand blasting through a stencil having cut-away parts corresponding to the small areas 10. The areas 10 of the mirror are thus left translucent but not transparent. The side walls of the sign frame 1 are fitted with internal plain mirrors 11 to conserve the light within the space a.

In the form shown, the reflector 5 is arranged at an angle of 30 degrees to the vertical.

It will be appreciated that the space a between the reflector 5 and the stencil 3 is uncovered at the top or is covered by clear glass or other light transmitting medium.

In use, light entering the top of space a and falling on the reflector 5 will be reflected forwardly thereof, and will illuminate the stencil 3 rendering it visible. Alternatively, when no such light is available, light derived from the electric lamp or lamps 9 will be transmitted through the small areas 10 of the reflector 5, being diffused or scattered by the dull surfaces of these areas and will equally render the stencil 3 visible. The internal rear wall of the frame 1 may be covered by a mirror or may be whitened to efficiently employ all the light emitted from the lamp 9.

The box sign illustrated is intended for use in shop fronts where the light entering the space a will be derived either from light entering the shop window or from the usual sources of illumination in the shop front. Such light will enter the space a from the front thereof and for this reason the reflector 5 is arranged comparatively steeply. Where, however, the box sign is intended to be used on facias or outside a building where the daylight illumination is derived from the sky, the reflector 5 will preferably be arranged at an angle of 45 degrees, and the stencil 3 would in this case be arranged vertically. In the form shown, it is arranged to slope forwardly from the base 4 in order that its upper edge may give sufficient width to the space a for an ample amount of light to enter the space for illumination of the stencil after reflection by the reflector, the lower edge of the stencil being arranged rearwardly of the forward edge to some extent to diminish the total bulk and weight of the sign.

It is to be understood, however, that the invention is capable of a wide variety of material embodiments and that the preferred form illustrated and the several modifications described are to be taken merely as preferred examples of the same, and that changes in arrangement and construction of parts may be made as required and found suitable so long as they remain within the spirit of the invention and scope of the following claims. For example, the reflector of silvered glass might be constructed by having the multitude of small areas silvered, and the remainder of the total area of the reflector translucent should it be found equally practicable so to construct it.

Further the frame of the sign might hold only the front display device and the rearward translucent reflector arranged at an angle thereto, the sign then being suspended in front of a normal or usual illuminating lamp in a shop front for which purpose the rear of the reflector is left exposed.

It is further to be understood that the word translucent as used in the specification and claims describes any medium which permits of light illumination passing therethrough irrespective of whether the rays are scattered or pass in unaffected pencils through the medium. In the following claims therefore the word translucent is used to include transparent areas.

I claim:—

1. A box sign comprising a front display device, a rearward reflector having a multitude of translucent areas spread over its reflecting surface arranged at an angle thereto and an illuminating means behind said reflector.

2. A box sign comprising a front display device, a rearward reflector having a multitude of similiarly shaped translucent areas spread over its reflecting surface arranged at an angle thereto and an illuminating means behind said reflector.

3. A box sign comprising a front display device, a rearward reflector having a multitude of similarly shaped and equally spaced translucent areas spread over its reflecting surface arranged at an angle thereto and an illuminating means behind said reflector.

4. A box sign comprising a front display device, a rearwardly-arranged glass at an angle to said display device said glass having a surface mirrored except as to a multitude of unmirrored areas within the total area of said surface, and an illuminating means behind said glass.

5. A box sign comprising a front display device, a rearwardly-arranged glass at an angle to said display device, said glass having a surface mirrored except as to a multitude of similarly-shaped unmirrored areas within the total area of said surface, and an illuminating means behind said glass.

6. A box sign comprising a front display device, a rearwardly-arranged glass at an angle to said display device said glass having a surface mirrored except as to a multitude of similarly-shaped and equally-spaced unmirrored areas within the total area of said surface, and an illuminating means behind said glass.

7. A box sign comprising a front display device, a rearwardly-arranged glass at an angle to said display device said glass having a surface mirrored except as to a multitude of equally spaced circular unmirrored areas within the total area of said surface, and an illuminating means behind said glass.

8. A box sign comprising a front display device, a rearward reflector having a multitude of equally spaced circular translucent areas spread over its reflecting surface arranged at an angle thereto and an illuminating means behind said reflector.

9. A box sign comprising a front display device, a rearwardly-arranged glass at an angle to said display device said glass having a surface mirrored except as to a multitude of unmirrored areas within the total area of said surface, and an illuminating means behind said glass, said unmirrored areas being rendered non-transparent.

10. A box sign comprising a front display device, a rearwardly-arranged glass at an angle to said display device said glass having a surface mirrored except as to a multitude of similarly-shaped and equally-spaced unmirrored areas within the total area of said surface, and an illuminating means behind said glass said unmirrored areas being rendered non-transparent.

11. A box sign comprising a front display device, a rearwardly-arranged glass at an angle to said display device said glass having a surface mirrored except as to a multitude of equally spaced circular unmirrored areas within the total area of said surface, and an illuminating means behind said glass, said unmirrored areas being rendered non-transparent.

12. A box sign for use by day or night in shop fronts comprising a base, a stencil sloping forwardly from the front of said base, a translucent reflector behind said stencil comprising a mirror having a multitude of translucent equally spaced similarly shaped areas left clear within its total area sloping rearwardly from said base, and illuminating means behind said reflector.

13. A box sign for use by day or night, comprising a base, a stencil sloping forwardly from the front of said base, a reflector having a multitude of translucent areas spread over its reflecting surface behind said stencil sloping rearwardly from said base, and illuminating means behind said reflector.

In testimony whereof I affix my signature.

WILLIAM ALBERT BURNS.